Patented Apr. 9, 1935

1,997,302

UNITED STATES PATENT OFFICE 1,997,302

METHOD FOR TREATING AND PURIFYING SEWAGE

Margaret M. Koller, Villa Park, and Maurice L. Miller, Chicago, Ill., assignors of one-third to H. A. Brassert & Co., Chicago, Ill., a corporation of Illinois No Drawing. Application August 26, 1932, Serial No. 630,576

32 Claims. (Cl. 210—2)

The invention has as its general object the provision of an improved method and means for treatment and purification of sewage or other waste liquors, containing organic matter in suspension and/or solution.

The primary object of the invention is the provision of an improved chemical process for treating and purifying sewage and other liquors containing dissolved and suspended organic matter, whereby all organic matter is rapidly rendered inert, and a high percentage is precipitated, yielding a sterilized and stabilized effluent, carrying substantially no suspended organic matter and substantially no dissolved organic matter, such of the organic matter as remains in the effluent being inert, and leaving an inert or sterilized and stabilized sludge.

Another object of the invention is the provision of an improved chemical treatment for sewage resulting in the stopping of substantially all bacterial action and the reduction of the biological oxygen demand to a negligible amount of liberating combined oxygen sufficient to provide an excess of dissolved oxygen in the effluent of at least ten parts per million.

A further object includes the provision of an improved method of purifying sewage and other liquids containing dissolved and suspended organic matter, involving both chemical treatment and precipitation without the use of trickling filters, digesting tanks, chlorination and activation processes, and one that avoids long retention periods of the liquid to be purified.

Still further objects include the provision of a novel treatment and purification process for sewage and the like, which acts rapidly, is simple of operation, economical and unaccompanied by any nuisance and detrimental effects on surrounding property.

Many other objects and advantages of our invention, resulting from our novel method of employment of chemical substances, herein to be more fully described in detail, will become obvious to those skilled in the art, as this specification and disclosure progresses.

Those skilled in the art are well aware of the fact that present methods of sewage purification are mostly directed along biological lines, involving the use of anaerobic and aerobic micro-organisms, which must be cultured and introduced into the sewage for purpose of digestion and nitrification of organic matter. The known biological processes for treating sewage are unsatisfactory for various reasons. The bacterial content of a particular sewage includes numerous varieties of micro-organisms, many of which function differently, while the total flora of one sewage may be of an entirely different character from that of another. Industrial wastes, commonly present in city sewage, may be present in varying quantities and characters, and since most industrial wastes exert an inhibitory effect on bacterial function, while many wastes arrest it altogether, complete and satisfactory biological treatment of sewage is obviously impossible. Superimposed upon this is the necessity of maintaining optimum conditions as regards temperature, etc., for the development and function of the bacteria involved in the purification process, all of which adds to the cost and detracts from the quality of the finished product.

It may also be mentioned that the biological methods of sewage purification require the use of primary and secondary settling tanks, aerators, digesting tanks, sludge drying beds, aereas, etc., all of which are a source of considerable nuisance in the form of odors, etc., the attracting of teste flies, insects, etc., all of which contribute to appreciably reduce surrounding land values. The process herein contemplated is productive of none of these nuisances, and is, therefore, of great economic and social importance, apart from its value as a superior process for the treatment of purification of sewage and like waste liquors.

In carrying out the process herein contemplated the following steps are involved:

(a) First the introduction of oxygen bearing and coagulating chemicals, which are thoroughly mixed with the sewage, so that a homogeneous distribution of these chemicals obtains in the liquid to be treated, thereby producing, substantially throughout the liquid, a finely divided coagulum, in which the oxygen bearing materials are substantially uniformly present, and then, just prior to flocculation;

(b) Introducing and thoroughly mixing in an oxidation accelerator or oxidation catalyst, preferably a metallic salt capable of reacting with the oxygen bearing materials, to liberate nascent oxygen and at the same time liberating the metallic ion of the salt so that it either remains free in the metallic state, and in which state it continues to act as an oxygen catalyst; or the metallic ion may react with the organic matter to form an organic salt of the metal, which has the properties of an oxidation accelerator or catalyst, and at the same time possesses strong potency in the destruction of bacteria—or both of these reactions may take place.

More specifically; a good grade of lime, preferably having a CaO content of not less than 68%, is employed as a preferred source of available oxygen. For the production of the coagulum, sodium aluminate, or a mixture of sodium aluminate and soda ash, comprising 30 parts by weight of $Na_2Al_2O_4$ to 100 parts of $Na_2CO_3$, may be employed. The amount of lime required will depend upon the oxygen demand of the sewage, together with the degree of purity of the lime as determined by its CaO content. In this regard it may be stated that a poor grade of lime militates against the ultimate stability of the sludge, since the complete stabilization of the sludge depends, to a large extent, on the oxygen derived from the lime, in connection with the catalyst to be later referred to, hence lime containing less than 68% available CaO should not be used when the best results are desired.

The calcium hydroxide is added primarily as a source of available oxygen, while the addition of the soda ash is primarily for the correction of the acidity of the sewage, and to bring the pH of the sewage to a point that yields the best coagulum with the sodium aluminate coagulate. In some waters, where the pH of the sewage is not strongly on the acid side, the soda ash may be appreciably reduced or even eliminated. Preferably the lime is added first, this being accomplished by feeding the lime, in measured quantities, from a dry feeder, into a vortex or solution chamber supplied with water. The lime partially enters into solution in the water and the undissolved portion is carried on by the stream in a state of suspension. In this form the milk of lime is introduced into the raw sewage at the point where the sewage enters a mixing tank of the conventional baffle plate type, which serves to mix the added chemicals thoroughly throughout the main body of the sewage. Where soda ash is added it may be added along with the lime and may be served from the same dry feeder, by first mixing the soda ash with the lime in the proper proportions. The sewage, after receiving the milk of lime, and soda ash mixture, when same is employed, is allowed to progress along the mixing tank for a short distance, or until the proper neutralization of the sewage has been accomplished, and then the coagulant, viz: sodium aluminate, is introduced. After introduction of the coagulant the sewage is again allowed to progress through the mixing tank until the coagulum is completely formed, but before any flocculation occurs the metallic catalyst is introduced.

Copper sulphate is preferably used as the metallic salt and after its addition, preferably in the form of a saturated solution, the treated sewage is allowed to flow through a sufficient length of the mixing tank to insure a complete mixing of the chemicals. It is thence lead into a sedimentation chamber of the conventional type, preferably one with a centre baffle wall, the rate of flow through the sedimentation chamber being such as to permit of a more or less complete settling out of the coagulated organic matter. In this way the effluent from the sedimentation chamber is substantially free from suspended matter, and through the action of the added chemicals, as will later be described in detail, the precipitated organic matter has become stabilized and sterilized, the organic matter in solution has become oxidized or rendered inert, whilst there is a virtually complete removal of micro-organisms of the fermentative or putrefactive types with particular reference to the facultative anaerobes, such as bacillus coli, etc., tests showing an absence of fermenting organisms in portions of water as large as 50 cc.

The results above outlined are obtained through the particular use of the chemicals, or their equivalent, here specified, and in the manner here prescribed, for reasons that will now be pointed out. It is to be understood, however, that we do not wish to limit ourselves to the specific chemicals herein enumerated, since any chemical or chemical compound having an equivalent function may be employed without departing from the spirit of our invention.

We will now deal with what is more particularly new and novel and which gives great value to this invention, and that is the manner in which the several elements of the process are handled. First let us state the problem which confronts one in the purification and stabilization of sewage. Organic matter is to be contended with, largely of the nature of proteins, both in ordinary and colloidal suspension and, to some degree, in solution. In addition there are present bacteria and micro-organisms which decompose the organic matter into products that are both highly odoriferous and toxic, such, for instance, as indole, skatole, ptomaines such as tetramethylene-diamine, or the so-called putrescine, pentamethylene-diamine, etc., all of which are the natural decomposition products of proteins, such as the albumins, etc.

Now it becomes necessary to break up the complex proteins and other organic bodies into simpler and stable substances, to precipitate, and therefore remove from suspension the gross particles present in the liquid, and to further oxidize, or otherwise stabilize the organic matter in solution. It is also necessary to remove as completely as possible bacteria and micro-organisms typical of sewage such as B. coli and associated pathogenic germs, and to correct any acidity which the sewage may contain, since, in the ultimate disposal of the purified effluent, an acid reaction is not favorable for discharge in public waterways, whereas a neutral or slightly alkaline effluent is much desired, since a slight alkalinity is quickly neutralized by the naturally occurring carbonic acid of surface waters.

It is readily seen that the introduction of the soda ash serves to neutralize existing acidity in the sewage, and to act as an alkali reserve for further need, should such develop. The soda ash is added, particularly to acid sewage, so as to preserve the calcium hydroxide, formed on addition of the milk of lime, as such, to as great an extent as possible, since it is from the calcium hydroxide that a major portion of the oxygen is derived for oxidation of the organic matter. In some cases it may be necessary to add the soda ash previous to the addition of the lime. It is also obvious that the addition of sodium aluminate serves to produce a coagulum in the sewage, especially in the presence of the soda ash and milk of lime, through hydrolysis of the aluminum salt to form aluminum hydroxide. In fact, in some cases, alum may be used to replace the sodium aluminate, but this is not preferred in the execution of this invention, because of the acidic character of the alums, which necessitates the use of greater portions of alkali, and produces somewhat less satisfactory results, as regards formation of floc, due to the rather critical character of the pH optimum for this reaction.

It is also obvious that when the coagulant is formed there will be entrained within it substantially uniform quantities of calcium hydroxide. Now a most important step in our process becomes manifest. It is at this point that the solution of copper sulphate is introduced. If the copper sulphate solution is quickly and well mixed with the body of the sewage, containing the finely divided coagulum, as the coagulum begins to floc, copper sulphate solution becomes occluded within the agglutinated particles of the coagulum or floc. A conditioned reaction now occurs wherein the copper sulphate reacts with the calcium hydroxide to produce calcium sulphate and hydroxyl ions with the liberation of metallic copper according to the equation:

(a) $Ca(OH)_2 + CuSO_4 = CaSO_4 + Cu + 2OH$ and with the subsequent liberation of nascent oxygen (b) $2OH \rightarrow H_2O + O$ The nascent oxygen thus liberated immediately reacts with the organic matter to stabilize it, however, a further oxidation, much in excess of that which would be obtained if the process were incorrectly carried out, such, for instance, as introducing the copper sulphate at the wrong time, is accomplished through the conditioned reaction of the copper with the organic matter of the coagulum. The copper liberated in atomic form, in intimate contact with the organic matter of the coagulum reacts with the organic matter to form unstable compounds therein, which, in turn, react with the remaining calcium hydroxide to produce further nascent oxygen and, in consequence, further oxidation of the organic matter. Bear in mind that the lime used is in considerable excess of the chemical equivalent of the copper sulphate employed. For instance, the reaction between copper sulphate and calcium hydroxide is molecular, hence their chemical equivalents are in the ratio of their molecular weights. Thus for each unit of copper sulphate there would be required only 0.47 unit of calcium hydroxide to satisfy the reaction of Equation (a) above. Ordinarily, for the treatment of a million gallons of sewage, lime would be used to an amount of 600 pounds, containing not less than 68% CaO, and this would produce, if all of the lime were CaO, 793 pounds $Ca(OH)_2$. With this quantity of lime we may use as much as 150 pounds of crystal copper sulphate ($CuSO_4 5H_2O$), as an upper limit, which is equivalent to 96 pounds of $CuSO_4$, and this would give a ratio of calcium hydroxide to copper sulphate of one unit of copper sulphate to 8.26 units of calcium hydroxide, but since the original lime was equivalent to only 86% CaO we must reduce the ratio accordingly. Thus we actually have one unit of $CuSO_4$ to 5.61 units $Ca(OH)_2$ as against the equivalent ratio of 1:0.47, or approximately 1200 per cent excess $Ca(OH)_2$. The catalytic effect of copper, in oxidation reactions, and more particularly in organic oxidations of the protein type, has been well established particularly in such reactions as the oxidation of organic thio compounds, with such proteins as glutathione, a tripeptide of albuminoid origin, very similar in structure and chemical characteristics to the organic matter to be met with in sewage. Further, the catalytic effect of copper in the regeneration of haemoglobin in anemia is recognized in the therapy of this disease and it is a novel feature of this invention to produce this catalytic agent, in situ, for the complete oxidation and stabilization of precipitated sludge in sewage purification, thus doing away entirely with the nuisance of unstable and putrefactive sludge.

Further, the catalytic effect of copper is not only exerted in causing the bound oxygen of the calcium hydroxide to become available for oxidation of the organic matter, but it further activates and causes to become rapidly available such oxygen as may be dissolved in the sewage liquors, and our work strongly indicates that the activity of copper in these reactions may be such as to draw oxygen from other, and for the moment, not strictly identified sources.

The usefulness of the copper does not end with its action in the coagulum and resulting precipitated sludge. After the floc has formed, and during precipitation, a considerable portion of the copper is in solution in the water, as well as appreciable quantities of calcium hydroxide. These combine to act on the organic matter in solution, the action being in two directions. One form of reaction that has been identified is parallel with that which occurs in the sludge, i. e. the copper combines with the calcium of the hydroxide to liberate nascent oxygen, which, in turn, oxidizes the organic matter, and the second course of the copper reaction is that of combining with certain albumins present in solution in the sewage to form insoluble albuminates, which are perfectly stable, and readily separate out and become precipitated. Thus the copper acts to complete the oxidation and stabilization of the organic matter both in solution and suspension, thereby giving a perfectly innocuous effluent, and a stable, non-putrefactive sludge. Even upon holding the sludge in a moist state for long periods of time, it is found that it remains sweet and free from fermentation or putrefaction. The effectiveness of the oxidation obtained by our process is such as to reduce the biochemical oxygen demand to substantially nil and leave a definite excess of dissolved oxygen in the purified effluent.

Very definite evidence pointing to the action of the copper as set forth above is found in the fact that the sludge retains its activity, and may be reintroduced into raw sewage, where it will exert an appreciable purifying effect. This indicates that the copper is in an active form to promote oxidation, either from some remaining source of oxygen not completely used up by the original sludge, or through rendering available, through catalytic action, oxygen accompanying the raw sewage, which is not available in the absence of the catalytic agent. Further evidence of the action of the copper in a cycle of reactions is that the oxygen is not all liberated spontaneously from its source, but is liberated only as used by the organic matter, thus definitely establishing copper as an oxidation intermediary, such action being obviously valuable, in that the oxygen is not all simultaneously evolved, which would result in appreciable loss, but is yielded up only as it is required and used, thus rendering available to the reaction the total quantity of oxygen present. In this connection it is desired to point out that very little, if any, copper remains in the effluent. Either the copper is retained by the sludge, or that which remains in solution is used up in reacting with the dissolved organic matter, and thus becomes precipitated. It may also be pointed out that if the sludge is dried and exposed to air for a long period of time it assumes a brown tint due to finely divided copper and copper oxide, which results through the further but non-putrefactive disintegration of the organic matter which held it in loose combination.

A further function of the copper, when introduced as in our process and in the manner as specified by this invention, is that of an active germicide. It has been stated that both the effluent and sludge is surprisingly free from bacteria, and more particularly organisms of the B. coli, and facultative anaerobic type. In the first place this removal of bacteria cannot be due to simple mechanical removal through entrainment in the precipitate, since both the sludge and effluent show a markedly different flora after treatment than that which characterized the raw sewage.

Further, if the removal of bacteria were simply that of precipitation there are no reasons for supposing that this precipitation would be selective, and that one type of organisms would be carried down in preference to another of substantially the same morphological characteristics.

We have found that it is the anaerobic and facultative anaerobic types of organisms that are substantially entirely removed in our process of sewage treatment, since cultures made from the effluent of sewage treated by our method show reductions of bacteria from original counts in the raw sewage in excess of two million, to less than 45,000, and with presumptive fermentation tests in the raw sewage positive in portions of 0.1 cc. and the effluent showing negative tests in portions of 50 cc. This action we ascribe to the copper, and since copper is of the same family of elements as silver, both having an incomplete outer electron shell with tendency to lose one electron in chemical combinations (copper losing both one and two electrons, having two valencies) it is reasonable to suppose that both metals would act substantially similar in their organic compounds. Our experiments have definitely established a definite and strong germicidal result of our process, distinctively selective in its effects towards pathogenic germs, and have further established that copper is the active germicidal agent, as used in our process. We have also found that the introduction of finely divided metallic copper is substantially the equivalent to the introduction of the copper in the form of the sulphate, hence the activity resides in the copper per se, rather than being incidental to the form in which the copper is introduced. We have also found that other metals which tend to act as oxidation catalysts, such, for instance, as manganese, also promote rapid oxidation of the organic matter, but copper is preferred by us both for its economy and superior activity in the process.

The purified effluent, resulting from treatment by our process, which is in every sense stable, may be discharged without danger or nuisance into any convenient water way, while the sludge produced, also perfectly stable, may be blown down from the sedimentation tank at given intervals, thickened, dried and disposed of by dumping or scattering on the soil, or may be disposed of in the moist state.

It is believed that the above set forth disclosure of our process will permit any one skilled in the art to practice the teachings of our invention, and that the disclosure establishes broadly an unique and valuable means of treating sewage and the like, and that our process not only involves a novel combination of chemical substances but a novel employment of such combination, in a manner and sequence that is productive of both novel and definite reactions, which lead to results not hitherto obtained in either the biochemical or chemical treatment of sewage, with the same accompanying simplicity of manipulation, apparatus and treatment, and at a cost that is economical in the extreme. Therefore, we do not wish to be limited by the disclosure herewith, which is broadly typical, but wish to cover the obvious equivalents, both as regards chemicals and procedure, and be limited in our claims only by such existing prior art as may rightly bear upon the appended claims.

Having thus described our invention what we claim and desire to cover by Letters Patent is:

1. A process for the treatment of liquids containing organic matter which consists in the introduction of an alkali for neutralization of existing acidity, the introduction of a substance containing oxygen in chemical combination adapted to be liberated in the presence of copper sulphate, the thorough mixing in of the alkali and oxygen carrying substance, and the subsequent introduction of copper sulphate for liberating the oxygen from said substance to oxidize the organic matter.

2. A process for the treatment of liquids containing organic matter which consists in the introduction of an alkali for neutralization of existing acidity, the introduction of calcium hydroxide, the thorough mixing in of the alkali and calcium hydroxide and the subsequent introduction of a metallic salt adapted to liberate the oxygen from the calcium hydroxide to oxidize the organic matter.

3. A process for the treatment of liquids containing organic matter which consists in the introduction of soda ash to neutralize existing acidity, the introduction of a substance containing oxygen in chemical combination and adapted to be liberated in the presence of metallic salt, the thorough mixing in of the soda ash and oxygen carrying substance and the subsequent introduction of a metallic salt adapted to liberate the oxygen from said substance to oxidize the organic matter.

4. A process for the treatment of liquids containing organic matter which consists in the introduction of an alkali for neutralization of existing acidity, the introduction of calcium hydroxide, the thorough mixing of the alkali and calcium hydroxide, and the subsequent introduction of copper sulphate for liberating the oxygen from said calcium hydroxide to oxidize the organic matter.

5. A process for the treatment of liquids containing organic matter which consists in the introduction of soda ash for neutralization of existing acidity, the introduction of a substance containing oxygen in chemical combination and adapted to be liberated in the presence of copper sulphate, the thorough mixing in of the soda ash and oxygen carrying substance, and the subsequent introduction of copper sulphate for liberating the oxygen from said substance to oxidize the organic matter.

6. A process for the treatment of liquids containing organic matter which consists in the introduction of soda ash for the neutralization of existing acidity, the introduction of calcium hydroxide, the thorough mixing in of the soda ash and calcium hydroxide, and the subsequent introduction of a metallic salt adapted to liberate the oxygen from the calcium hydroxide to oxidize the organic matter.

7. A process for the treatment of liquids containing organic matter which consists in the introduction of and thorough mixing of coagulating chemicals and a substance containing oxygen in chemical combination adapted to be liberated by certain metallic salts to produce a homogeneous distribution of the chemicals resulting in the production of a finely divided coagulant followed by flocculation throughout the liquid, and the introduction just prior to flocculation of a metallic salt adapted to liberate the oxygen from said substance.

8. A process for the treatment of liquids containing organic matter which consists in the introduction and mixing of sodium aluminate and a substance containing oxygen in chemical combination adapted to be liberated in the presence of certain metallic salts to produce a homogeneous distribution thereof resulting in the production of a finely divided coagulant followed by flocculation throughout the liquid and the introduction just prior to flocculation of a metallic salt adapted to liberate the oxygen from said substance.

9. A process for the treatment of liquids containing organic matter which consists in the introduction and mixing of calcium hydroxide and of coagulating chemicals to produce homogeneous distribution thereof resulting in the production of a finely divided coagulant followed by flocculation throughout the liquid, and the introduction just prior to flocculation of a metallic salt adapted to liberate the oxygen from said calcium hydroxide.

10. A process for the treatment of liquids containing organic matter which consists in the introduction and mixing of sodium aluminate and a substance containing oxygen in chemical combination adapted to be liberated in the presence of copper sulphate to produce homogeneous distribution of the substance and aluminate resulting in the production of a finely divided coagulant followed by flocculation throughout the liquid and in the introduction just prior to flocculation of copper sulphate.

11. A process for the treatment of liquids containing organic matter which consists in the introduction and mixing of calcium hydroxide and sodium aluminate to produce a homogeneous distribution of the hydroxide and aluminate resulting in the production of a finely divided coagulant followed by flocculation throughout the liquid, and the introduction just prior to flocculation of a metallic salt adapted to liberate oxygen from said calcium hydroxide.

12. A process for the treatment of liquids containing organic matter which consists in the introduction and mixing of calcium hydroxide and of coagulating chemicals in a manner to produce a homogeneous distribution thereof resulting in the production of a finely divided coagulant followed by flocculation throughout the liquid and the introduction just prior to flocculation of copper sulphate in proportions by weight of approximately one part to four parts of calcium hydroxide.

13. A process for the treatment of liquids containing organic matter which consists in the introduction of an alkali for neutralization of existing acidity, the introduction of coagulating chemicals and a substance containing oxygen in chemical combination adapted to be liberated in the presence of copper sulphate, the mixing of said alkali substance and chemicals to produce a homogeneous distribution thereof resulting in the production of a finely divided coagulant followed by flocculation throughout the liquid, and the introduction just prior to flocculation of copper sulphate.

14. A process for the treatment of liquids containing organic matter which consists in the introduction of an alkali for neutralization of existing acidity, the introduction of sodium aluminate and a substance containing oxygen in chemical combination adapted to be liberated in the presence of copper sulphate, the mixing of said materials to produce a homogeneous distribution thereof resulting in the production of a finely divided coagulant followed by flocculation throughout the liquid, and the introduction just prior to flocculation of copper sulphate.

15. A process for the treatment of liquids containing organic matter which consists in the introduction of an alkali for neutralization of existing acidity, the introduction of calcium hydroxide and coagulating chemicals, the mixing of said materials to produce a homogeneous distribution thereof resulting in the production of a finely divided coagulant followed by flocculation throughout the liquid and the introduction just prior to flocculation of a metallic salt adapted to liberate oxygen from said calcium hydroxide.

16. A process for the treatment of liquids containing organic matter which consists in the introduction of soda ash for neutralization of existing acidity, the introduction of coagulating chemicals and a substance containing oxygen in chemical combination adapted to be liberated in the presence of certain metallic salts, and the mixing of said materials to produce homogeneous distribution thereof resulting in the production of a finely divided coagulant followed by flocculation throughout the liquid and the introduction just prior to flocculation of a metallic salt adapted to liberate oxygen from said substance.

17. A process for the treatment of liquids containing organic matter which consists in the introduction of an alkali for neutralization of existing acidity, the introduction of sodium aluminate and a substance containing oxygen in chemical combination adapted to be liberated in the presence of copper sulphate, and the mixing of said materials to produce a homogeneous distribution thereof resulting in the production of a finely divided coagulant followed by flocculation throughout the liquid, and the introduction just prior to flocculation of copper sulphate in the quantity described.

18. A process for the treatment of liquids containing organic matter which consists in the introduction of an alkali for neutralization of existing acidity, the introduction of calcium hydroxide and coagulating chemicals, the mixing of said materials to produce a homogeneous distribution thereof resulting in the production of a finely divided coagulant followed by flocculation throughout the liquid, and the introduction just prior to flocculation of copper sulphate in proportions by weight of approximately one part to four parts of calcium hydroxide.

19. A process for the treatment of liquids containing organic matter which consists in the introduction of an alkali for neutralization of existing acidity, the introduction of calcium hydroxide and sodium aluminate, the mixing of said materials sufficient to produce a homogeneous distribution thereof resulting in the production of a finely divided coagulant followed by flocculation throughout the liquid, and the introduction just prior to flocculation of a metallic salt adapted to liberate oxygen from said calcium hydroxide.

20. A process for the treatment of liquids containing organic matter which consists in the introduction of soda ash for neutralization of existing acidity, the introduction of sodium aluminate and a substance containing oxygen in chemical combination adapted to be liberated in the presence of certain metallic salts, and the mixing of said materials to produce a homogeneous distribution thereof resulting in the production of a finely divided coagulant followed by flocculation throughout the liquid and the introduction just prior to flocculation of a metallic salt adapted to liberate oxygen from said substance.

21. A process for the treatment of liquids containing organic matter which consists in the introduction of soda ash for neutralization of existing acidity, the introduction of coagulating chemicals and a substance containing oxygen in chemical combination adapted to be liberated in the presence of copper sulphate, and the mixing of said materials to produce a homogeneous distribution of the chemicals resulting in the production of a finely divided coagulant followed by flocculation throughout the liquid and the introduction just prior to flocculation of copper sulphate.

22. A process for the treatment of liquids containing organic matter which consists in the introduction of soda ash for neutralization of existing acidity, the introduction of calcium hydroxide and coagulating chemicals, the mixing of said materials to produce a homogeneous distribution of the chemicals resulting in the production of a finely divided coagulant followed by flocculation throughout the liquid, and the introduction just prior to flocculation of a metallic salt adapted to liberate oxygen from said calcium hydroxide.

23. A process for the treatment of liquids containing organic matter which consists in the introduction of an alkali for neutralization of existing acidity, the introduction of calcium hydroxide and sodium aluminate, the mixing of said materials to produce a homogeneous distribution of the hydroxide and aluminate resulting in the production of a finely divided coagulant followed by flocculation through the liquid, and the introduction just prior to flocculation of copper sulphate in proportions by weight of approximately one part to four parts of calcium hydroxide.

24. A process for the treatment of liquids containing organic matter which consists in the introduction of soda ash for neutralization of existing acidity, the introduction of sodium aluminate and a substance containing oxygen in chemical combination adapted to be liberated in the presence of copper sulphate and the mixing of said materials to produce a homogeneous distribution of the substance and aluminate resulting in the production of a finely divided coagulant followed by flocculation throughout the liquid, and the introduction just prior to flocculation of copper sulphate.

25. A process for the treatment of liquids containing organic matter which consists in the introduction of soda ash for neutralization of existing acidity, the introduction of calcium hydroxide and coagulating chemicals, the mixing of said materials to produce a homogeneous distribution thereof resulting in the production of a finely divided coagulant followed by flocculation throughout the liquid and the introduction just prior to flocculation of copper sulphate in proportions by weight of approximately one part to four parts of calcium hydroxide.

26. A process for the treatment of liquids containing organic matter which consists in the introduction of soda ash for neutralization of existing acidity, the introduction of calcium hydroxide and sodium aluminate, the mixing of said materials to produce a homogeneous distribution of the hydroxide and aluminate resulting in the production of a finely divided coagulant followed by flocculation throughout the liquid, and the introduction just prior to flocculation of a metallic salt adapted to liberate oxygen from said calcium hydroxide.

27. A process for the treatment of liquids containing organic matter which consists in the introduction of soda ash for neutralization of existing acidity, the introducton of calcium hydroxide and sodium aluminate, the mixing of said materials to produce a homogeneous distribution of the hydroxide and aluminate resulting in the production of a finely divided coagulant followed by flocculation throughout the liquid, and the introduction just prior to flocculation of copper sulphate in the quantity described.

28. A process for the treatment of liquids containing organic matter which consists in the introduction of an alkali for neutralization of existing acidity, the introduction of a substance containing oxygen in chemical combination, the thorough mixing in of the alkali and oxygen carrying substance and the subsequent introduction of an agent adapted to liberate the oxygen from said substance to oxidize the organic matter.

29. A process for the treatment of liquids containing organic matter which consists in the introduction of an alkali for neutralization of existing acidity, the introduction of a substance containing oxygen in chemical combination, the thorough mixing in of the alkali and oxygen carrying substance and the subsequent introduction of a metallic salt adapted to liberate the oxygen from said substance to oxidize the organic matter.

30. A process for the treatment of liquids containing organic matter which consists in the introduction of an alkali for neutralization of the existing acidity and the introduction of a substance containing oxygen in chemical combination in a manner to effect the thorough mixing of the alkali and oxygen bearing substance with the liquid, and the subsequent introduction of a metallic salt adapted to initially react with said oxygen bearing substance to liberate metallic ions and to liberate oxygen to oxidize the organic matter, said metallic salt further acting as a catalytic agent for the continued liberation of oxygen following said initial reaction.

31. The process of treating sewage and other liquids containing organic matter which consists in the introduction of coagulating chemicals and oxygen bearing material adapted to liberate its oxygen in the presence of copper sulphate in a manner and in amounts sufficient to produce a homogeneous distribution of the chemicals resulting in the production of a finely divided coagulant followed by flocculation throughout the liquid, and the introduction just prior to flocculation of copper sulphate in the quantity described.

32. The process of treating sewage and other liquids containing organic matter which consists in the introduction of calcium hydroxide and sodium aluminate in a manner and in the quantities described to produce a homogeneous distribution of said chemicals resulting in the production of a finely divided coagulum followed by flocculation throughout the liquid, the introduction and thorough dissemination of copper sulphate just prior to flocculation whereby a portion of the copper sulphate is entrained with the coagulated and flocculated organic matter and a portion remains in the effluent.

MARGARET M. KOLLER.
MAURICE L. MILLER.